United States Patent
Ott et al.

[11] Patent Number: 5,195,566
[45] Date of Patent: Mar. 23, 1993

[54] CAP FOR THE FILLER NECK OF LIQUID CONTAINERS

[75] Inventors: Siegfried Ott, Traunstein-Hufschlag, Fed. Rep. of Germany; Friedrich Wimmer, Schalchen, Austria

[73] Assignee: Mecrom Ott & Holey OHG, Hufschlag, Fed. Rep. of Germany

[21] Appl. No.: 694,398

[22] Filed: May 1, 1991

[51] Int. Cl.[5] .......................................... B65B 31/00
[52] U.S. Cl. .................................. 141/312; 141/372;
       141/369; 141/59; 220/DIG. 33; 220/254;
       220/344
[58] Field of Search ............. 141/312, 348, 350, 349,
       141/372, 369, 370, 59; 220/DIG. 33, 254, 344

[56] References Cited
U.S. PATENT DOCUMENTS

| | | |
|---|---|---|
| 2,551,058 | 5/1951 | Selzler et al. |
| 2,657,824 | 11/1953 | Mariani |
| 3,344,947 | 10/1967 | Gallup |
| 3,918,606 | 11/1975 | Keller ................................ 220/202 |
| 4,091,959 | 5/1978 | O'Banion ........................... 220/304 |
| 4,265,752 | 5/1981 | O'Banion ........................... 210/172 |
| 4,424,839 | 1/1984 | Otani et al. ........................ 141/348 |
| 4,498,600 | 2/1985 | Blion ................................. 220/255 |
| 4,527,825 | 7/1985 | Clouse ............................... 296/1 C |
| 4,630,749 | 12/1986 | Armstrong et al. ............... 220/86 R |
| 4,632,270 | 12/1986 | Sasaki et al. ...................... 220/86 R |
| 4,702,386 | 10/1987 | Boehmer et al. .................. 220/86 R |
| 4,747,508 | 5/1988 | Sherwood .......................... 220/86 R |
| 4,762,247 | 8/1988 | Temmesfeld ...................... 220/303 |
| 4,779,755 | 10/1988 | Harris ................................ 220/203 |
| 4,809,863 | 3/1989 | Woodcock et al. ............... 220/85 F |
| 4,986,439 | 1/1991 | Ott et al. ........................... 220/334 |
| 5,042,678 | 8/1991 | Munguia ........................... 220/254 |
| 5,056,570 | 10/1991 | Harris et al. ...................... 141/302 |

*Primary Examiner*—Ernest G. Cusick
*Attorney, Agent, or Firm*—Sixbey, Friedman, Leedom & Ferguson

[57] ABSTRACT

A self-closing cap for the filler neck of liquid containers, comprising a closure ring having an annular seal, said ring being attachable to said filler neck and having an orifice for receiving a nozzle that discharges a pressurized stream of liquid into the container, and of a spring-biased closure flap swivel-mounted on said closure ring and provided with a seal, wherein the improvement is the provision of a gasket around the orifice for preventing atomized liquid from said nozzle from being back-blown out of the orifice and onto the hand of the person handling the nozzle.

8 Claims, 2 Drawing Sheets

16,195,566

CAP FOR THE FILLER NECK OF LIQUID CONTAINERS

BACKGROUND OF THE INVENTION

This invention refers to a self-closing cap for the filler necks of liquid containers such as barrels, canisters, tanks and the like, as well as fuel tanks of motor vehicles, comprising a closure ring with a seal, said ring being attachable to the filler neck and having an orifice for receiving a nozzle that discharges a pressurized stream of liquid into the container, and a closure flap swivel-mounted on said closure ring and provided with a seal, said flap being opened during the filling of the container by the insertion of the nozzle into the filler neck and automatically closing under the influence of a spring upon withdrawal of the nozzle from the filler neck, wherein the improvement is the provision of a gasket around the orifice for preventing atomized liquid from being discharged out of the orifice and onto the hand of the person operating the nozzle.

A wide variety of filler neck caps for the fuel tanks of automotive vehicles are known in the prior art. In many of these filler neck caps, the applicants have noticed that the pivoting closure flap can obstruct the amount of space between the nozzle of the gas pump and the orifice in the center of the cap to an extent to where atomized fuel can be blown back out of the tank and onto the hand of the person handling the pump nozzle as the pressurized stream of liquid and volatile fuel displaces air from the tank during the tank filling operation. This is a significant shortcoming, since the volatile components of fuel can soak into the skin which is not only unhealthy, but causes the hand of the nozzle operator to smell of gasoline or the like. Still another shortcoming of such prior art filler caps results from the fact that the filler necks of some automobiles include a built-in "trap door" structure a few inches down from their upper ends through which the end of the fuel pump nozzle must be inserted before fuel can enter the tank. If a filler cap of the type previously described is mounted onto such a filler neck, it becomes difficult to insert the nozzle through both the closure flap of the cap and the trap door of the filler neck since the cap orifice is necessarily smaller than the opening on top of the filler neck.

OBJECT OF THE INVENTION

The object of the invention is to create a cap for the filler necks of liquid containers which overcomes the shortcomings of the prior art by means of a simple design that is easy to manufacture.

For the solution of this problem in accordance with the invention it is proposed that the cap in question be designed as given in claim 1. Additional advantageous features of the cap are to be found in the subclaims, as well as the following description of a particularly preferred embodiment shown in FIGS. 1 through 5 of the drawings.

Figure 1:
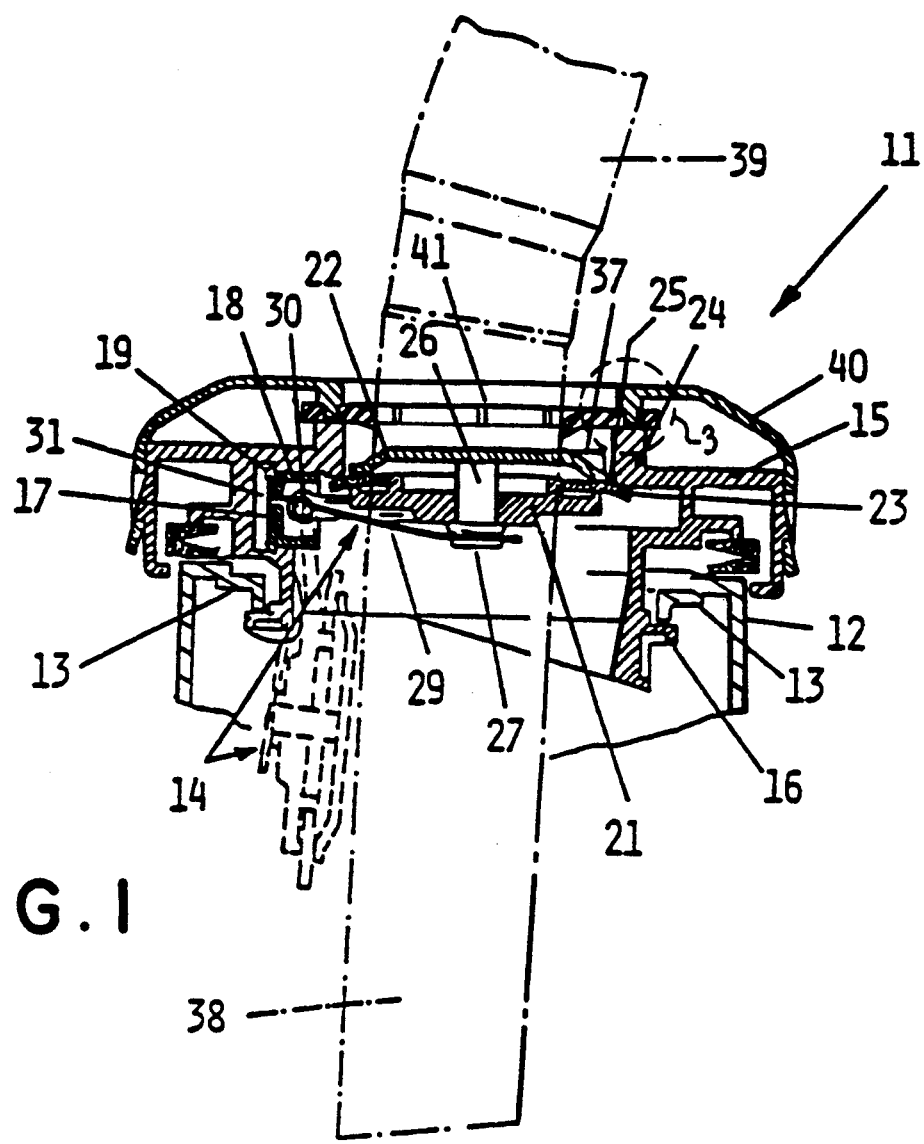
FIG. 1 shows a section through the cap attached to the filler pipe of a liquid container.

As visible in FIG. 1, the cap 11 designed according to the invention is attached to the mouth of a filler neck 12 of a liquid container or the like. Associated therewith is a bayonet joint ring 13 on the mouth of the filler neck 12, with either the cap 11 with its swivel-mounted closure flap 14 according to the invention or another closure lid being attachable thereto.

Figure 2:
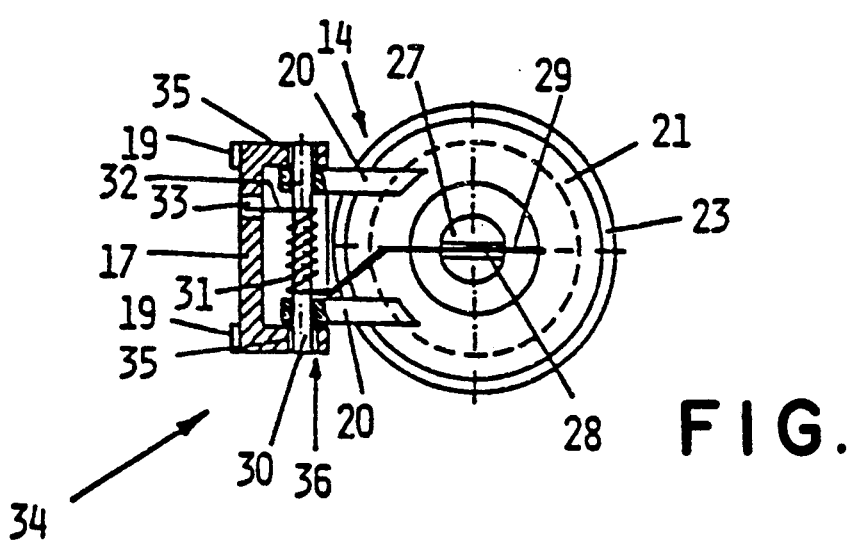
FIG. 2 shows a plan view of the lower or back side of the swivel-mounted closure flap and its bearing.

The cap 11 comprises a closure ring 15 with bayonet catches 16 to fasten it to the bayonet joint ring 13 of the filler neck 12. The closure flap 14 is swivel-mounted on the closure ring 15 by means of a bearing block 17, as can be seen particularly in FIG. 2. A recess 18 into which the bearing block 17 can be inserted and secured is located on the inner side of the closure ring 15; the bearing block is secured advantageously by means of locking teeth 19 disposed on the bearing block 17.

The closure flap 14 consists of an inner disc 21 with bearing arms 20 and an outer disc 22 connected thereto. An annular seal 23 is clamped between the two discs 21 and 22. In order to provide a tight closure of the orifice 25, this seal abuts the rim 24 of the orifice 25 in the closure ring 15, to be closed by the closure flap 14. A central pin 26 seated on the outer disc 22 serves to connect the two discs 21 and 22. A threaded head 27 is mounted on the free end of said pin and is provided with a radial groove 28 to receive the one end 29 of the locking spring 31 seated on the bearing shaft 30, the second end 32 of said spring mating with a notch 33 in the bearing block 17.

Thus the closure flap 14 with its bearing forms a preassembled unit 34 capable of being simply and therefore economically mounted and secured during the final assembly of the cap 11, as all that is required is the insertion of the bearing block 17 into the recess 18 in the closure ring 15.

To guarantee a faultless seal between the closure flap 14 and the edge 24 around the orifice 25 in the closure ring 15, i.e. to guarantee a perfect abutment of the annular seal 23 against its seat along the rim 24, a certain, adequately dimensioned amount of play 36 exists between the bearing bores 35 for the bearing shaft 30 and the shaft itself, making it possible for the inner disc 21 of the closure flap 14 to fully urge the annular seal 23 peripherally against its seat. This bearing play 36 makes it possible to compensate tolerances conditioned by manufacturing and assembly in the simplest manner.

In order to always attain faultless centering of the closure flap 14 relative to the orifice 25 in the closure ring 15, centering studs 37 are provided on the outer disc 22 of the closure flap 14, one of which is located diametrally to the bearing shaft 30.

In order to fill a liquid container on the filler neck of which the cap 11 according to the invention is mounted, it is merely necessary to insert the nozzle 38, shown with dotted lines, of a fuel pump 39 through the orifice 25 in the closure ring 15 and into the filler neck 12, wherein the closure flap 14 is swung to the side against the pressure of the locking spring 31. Upon completion of the filling, the nozzle 38 is withdrawn, with the closure flap 14 automatically reclosing the orifice 25.

The cap 11 is advantageously provided with a cover 40 having a central aperture 41 disposed coaxially to the orifice 25 in the closure ring 15. The cover 40 can be clamped fast to the closure ring 15 or secured by latching means known per se.

Closures of the type described offer the advantage of eliminating the necessity of removing the filler neck cap each time, as is otherwise the case when liquid containers must be filled frequently.

To allow the cap 11 of the invention to be used on filler necks which include a recessed "trap door" through which the nozzle 38 must be inserted before the container may be filled, the diameter of the orifice 25 should be at least 25 percent and preferably 50 percent larger than the diameter of the nozzle 38 which is receives. Such dimensioning allows enough play between the nozzle 38 and the edges of the orifice 25 to allow the nozzle operator to easily manipulate and insert the nozzle through any recessed "trap door" structure in the filler neck. Also, to minimize the amount of obstruction that the swivel mounted closure cap 14 presents to either the nozzle 38 or displaced air being blown out of the tank during the filling operation, the recess 18 in the inner side of the ring 15 should be made as deep as possible, and an additional recess 40.5 should be provided lower down on the inner side of the ring 15 to receive the underside of the closure cap 14.

Figure 3:
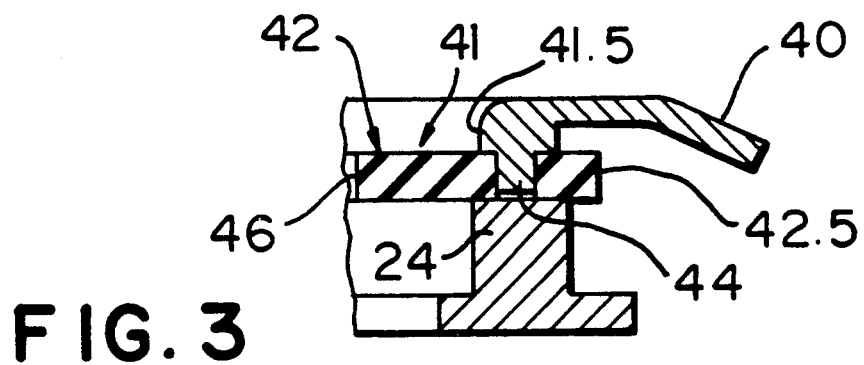
FIG. 3 is an enlargement of the area enclosed within the dotted circle in FIG. 2.
Figure 4:
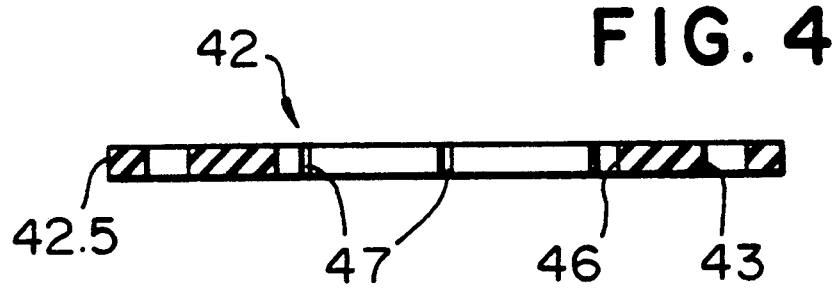
FIG. 4 is a cross-sectional side view of the gasket used to prevent gasoline blow-back in the cap of the invention.
Figure 5:
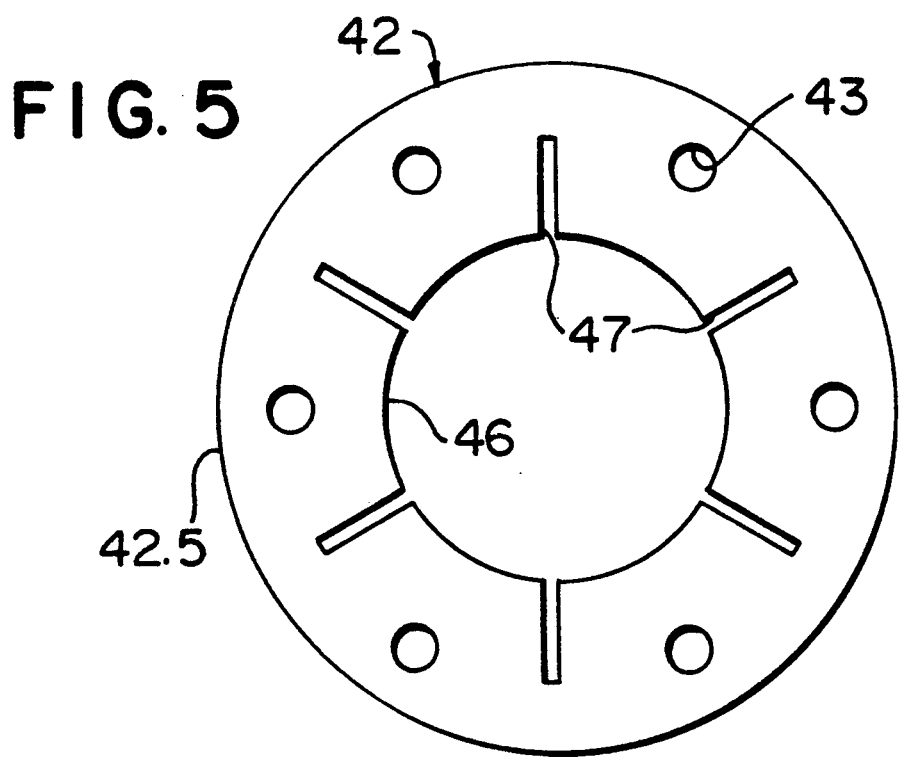
FIG. 5 is a plan view of the gasket illustrated in FIG. 4.

With reference now to FIGS. 1 and 3, the cap 11 is further provided with a gasket 42 which is mounted over the orifice 25 of the closure ring 15. In the preferred embodiment, the gasket 42 is formed from an inert, resilient plastic material which may be fabric-reinforced. As is most clearly seen in FIGS. 3, 4 and 5, the gasket 42 is annular, having an outer edge 42.5 secured between the rim 24 of the closure ring 15, and the inner edge 41.5 of the central aperture 41 of the cover 40. To this end, the outer edge 42.5 of the gasket 42 includes bores 43 which receive studs 44 present around the inner edge 41.5 of the aperture 41 of the cover 40. The inner diameter 46 of the gasket 42 is dimensioned so that it is approximately the same as the outer diameter of the nozzle 38 used to fill the container that the cap 11 is mounted on. Additionally, the gasket 42 includes a plurality of radially-disposed slots 47 best seen in FIG. 5 which define flaps 48 in the gasket 42.

In operation, the resiliency of the material forming the gasket 42, in combination with the radial slots 47, render the gasket 42 sufficiently compliant to accommodate both the insertion of a nozzle 38 of a gas pump into the cap 11 (even where such a nozzle 38 is circumscribed by another structure, such as a coil-spring) as well as the lateral manipulation of the nozzle 38 after such insertion so that the nozzle maybe aligned with and inserted through any "trap door" structure which the filler neck may have. Thus the gasket 42 presents no significant obstacle to the insertion and manipulation of a nozzle 38. However, despite the extreme compliance of the gasket 42, the flaps 48 of compliant sheet material defined between the radial slots 47 advantageously provide a barrier which obstructs atomized fuel from being blown back through the orifice 25 in the closure ring 15 and impinging on the hand of the person operating the nozzle 38. At the same time, the radial slots 47 allow displaced air to be freely conducted through the gasket 42. This last function of the radial slots 47 is an important one, as many nozzles 38 for the dispensing of fuel include a pressure-actuated cut-off valve which can be spuriously actuated if there is a insufficient venting of the air being displaced out of the fuel tank during the filling operation. Hence the slotted gasket 42 is capable of substantially obstructing atomized fuel from being blown back onto the hand of the nozzle operator while still providing sufficient venting of this displaced air so that the pressure-actuated cut-off valve in the nozzle 38 is not spuriously actuated.

We claim:

1. A self-closing cap for the filler neck of a liquid container, comprising a closure ring being detachably mountable to said filler neck and having an orifice for receiving a nozzle that discharges a pressurized stream of liquid and a spring-biased closure flap pivotally mounted to said closure ring such that said closure flap is located within said orifice when the closure flap is in a first position and the closure flap is located outside the orifice in a second position when the spring bias is overcome by insertion of the nozzle through the orifice and being provided with a seal for sealingly engaging said orifice until said spring-bias is overcome, and a gasket having an outer edge mounted around and above said orifice, and an inner edge that defines an aperture about the same size or slightly smaller in cross-section than said nozzle for obstructing droplets of atomized liquid from being discharged out of said orifice when said nozzle discharges a pressurized stream of liquid into said container, said gasket forming only on incomplete seal between said nozzle and said orifice for defining an opening for conducting air and vaporized liquid displaced out of the liquid container out of the orifice.

2. A self-closing cap as defined in claim 1, wherein said liquid container is the fuel tank of a vehicle, and said nozzle is the nozzle of a fuel pump having a pressure sensitive pump deactuator.

3. A self-closing cap as defined in claim 2, wherein said gasket is annular, and includes a plurality of radially-oriented slots for both yieldably accommodating a variety of different nozzle diameters, and for conducting displace air from the interior of the fuel tank through said orifice.

4. A self-closing cap as defined in claim 1, wherein said closure ring includes a projecting rim that circumscribes said orifice, and wherein the outer edge of said gasket is mounted around said projecting rim.

5. A self-closing cap as defined in claim 4, further comprising a cover having an orifice aligned with said orifice of said closure ring when said cover is secured over said ring, and wherein the outer edge of said gasket is captured between the projecting rim of said closure ring and the inner edge of said cover orifice.

6. A self-closing cap as defined in claim 5, further comprising mounting studs between said projecting rim and said inner edge of said cover orifice and mounted on either of said inner edge of said cover or said projecting rim for securing the outer edge of said gasket.

7. A self-closing cap as defined in claim 1, wherein the orifice of said closure ring is at least 25 percent larger in diameter than the diameter of said nozzle.

8. A self-closing cap as defined in claim 7, wherein the gasket is annular, and wherein the inner diameter of the gasket is about the same diameter as said nozzle.

* * * * *